US009002721B2

(12) United States Patent
Hughes

(10) Patent No.: US 9,002,721 B2
(45) Date of Patent: Apr. 7, 2015

(54) SYSTEM AND METHOD FOR PROJECT MANAGEMENT AND COMPLETION

(75) Inventor: John M. Hughes, Hebron, CT (US)

(73) Assignee: Appirio, Inc., San Francisco, CA (US)

( * ) Notice: Subject to any disclaimer, the term of this patent is extended or adjusted under 35 U.S.C. 154(b) by 878 days.

(21) Appl. No.: 12/575,451

(22) Filed: Oct. 7, 2009

(65) Prior Publication Data

US 2010/0174579 A1 Jul. 8, 2010

Related U.S. Application Data

(60) Provisional application No. 61/103,735, filed on Oct. 8, 2008.

(51) Int. Cl.
G06Q 10/00 (2012.01)
G06Q 10/10 (2012.01)
G06Q 10/06 (2012.01)

(52) U.S. Cl.
CPC .......... *G06Q 10/10* (2013.01); *G06Q 10/06311* (2013.01); *G06Q 10/067* (2013.01); *G06Q 10/103* (2013.01)

(58) Field of Classification Search
CPC ................... G06F 1/00–21/00; G06F 1/2101; G06F 1/22; G06F 1/2201; H04N 1/00–21/00; H04N 1/2101; H04N 1/2201; H04N 1/2213
USPC ...................... 705/7.11–7.42, 1.1, 14.1–14.4; 726/1–34; 715/200, 700, 961–978
See application file for complete search history.

(56) References Cited

U.S. PATENT DOCUMENTS

| | | | | |
|---|---|---|---|---|
| 5,408,663 A | * | 4/1995 | Miller | 718/104 |
| 5,818,715 A | * | 10/1998 | Marshall et al. | 705/7.12 |
| 5,826,239 A | * | 10/1998 | Du et al. | 705/7.26 |
| 5,907,490 A | * | 5/1999 | Oliver | 700/90 |
| 6,098,091 A | * | 8/2000 | Kisor | 709/202 |
| 6,101,481 A | * | 8/2000 | Miller | 705/7.13 |
| 6,112,225 A | * | 8/2000 | Kraft et al. | 709/202 |
| 6,249,715 B1 | * | 6/2001 | Yuri et al. | 700/111 |
| 6,431,875 B1 | * | 8/2002 | Elliott et al. | 434/322 |
| 6,434,738 B1 | * | 8/2002 | Arnow | 717/106 |
| 6,519,763 B1 | * | 2/2003 | Kaufer et al. | 717/101 |
| 6,532,448 B1 | * | 3/2003 | Higginson et al. | 705/14.14 |
| 6,578,005 B1 | * | 6/2003 | Lesaint et al. | 705/7.14 |
| 6,850,895 B2 | * | 2/2005 | Brodersen et al. | 705/7.14 |
| 6,915,266 B1 | * | 7/2005 | Saeed et al. | 705/2 |
| 6,966,033 B1 | * | 11/2005 | Gasser et al. | 715/738 |
| 7,027,997 B1 | * | 4/2006 | Robinson et al. | 705/7.26 |
| 7,086,057 B2 | * | 8/2006 | Hayashi | 718/102 |
| 7,093,004 B2 | * | 8/2006 | Bernardin et al. | 709/219 |
| 7,095,841 B2 | * | 8/2006 | Mullen | 379/265.1 |

(Continued)

OTHER PUBLICATIONS

TopCoder.com website, selected pages Jun.06-Nov. 6, downloaded from web.archive.com.*

*Primary Examiner* — Alan S Miller
(74) *Attorney, Agent, or Firm* — Goodwin Procter LLP

(57) ABSTRACT

In general, in one aspect, a system for planning and executing projects, facilitates creating a project model comprising tasks and dependencies, determining the complexity of the tasks, and modifying the tasks to maintain complexity within predetermined bounds. The system can facilitate designating one or more tasks to be redundant tasks, and undertaking the redundant tasks with redundant resources. In some embodiments, the system includes a module for evaluating task criticality and designating redundant tasks based on the task complexity and criticality.

15 Claims, 5 Drawing Sheets

(56) References Cited

U.S. PATENT DOCUMENTS

| | | | |
|---|---|---|---|
| 7,155,400 B1* | 12/2006 | Jilk et al. | 705/7.14 |
| 7,162,433 B1* | 1/2007 | Foroutan | 705/7.42 |
| 7,503,033 B2* | 3/2009 | Meredith et al. | 717/104 |
| 7,539,907 B1* | 5/2009 | Johnsen et al. | 714/47.2 |
| 7,640,548 B1* | 12/2009 | Yu et al. | 718/106 |
| 7,761,393 B2* | 7/2010 | Macbeth et al. | 706/16 |
| 7,949,610 B2* | 5/2011 | Belvin et al. | 705/301 |
| 7,954,106 B2* | 5/2011 | Kern et al. | 718/104 |
| 8,219,997 B2* | 7/2012 | Shimizu et al. | 718/104 |
| 2002/0023117 A1* | 2/2002 | Bernardin et al. | 709/104 |
| 2002/0029161 A1* | 3/2002 | Brodersen et al. | 705/9 |
| 2002/0038221 A1* | 3/2002 | Tiwary et al. | 705/1 |
| 2002/0144255 A1* | 10/2002 | Anderson | 717/174 |
| 2003/0009740 A1* | 1/2003 | Lan | 717/102 |
| 2003/0018512 A1* | 1/2003 | Dortmans | 705/9 |
| 2003/0145124 A1* | 7/2003 | Guyan et al. | 709/318 |
| 2003/0191795 A1* | 10/2003 | Bernardin et al. | 709/105 |
| 2003/0192029 A1* | 10/2003 | Hughes | 717/101 |
| 2004/0078777 A1* | 4/2004 | Bahrami | 717/105 |
| 2004/0083448 A1* | 4/2004 | Schulz et al. | 717/101 |
| 2004/0098447 A1* | 5/2004 | Verbeke et al. | 709/201 |
| 2005/0091098 A1* | 4/2005 | Brodersen et al. | 705/8 |
| 2005/0160395 A1* | 7/2005 | Hughes | 717/102 |
| 2005/0171790 A1* | 8/2005 | Blackmon | 705/1 |
| 2005/0240916 A1* | 10/2005 | Sandrew | 717/154 |
| 2006/0058948 A1* | 3/2006 | Blass et al. | 701/207 |
| 2006/0059490 A1* | 3/2006 | Knapp et al. | 718/100 |
| 2006/0069605 A1* | 3/2006 | Hatoun | 705/9 |
| 2006/0173724 A1* | 8/2006 | Trefler et al. | 705/8 |
| 2006/0252479 A1* | 11/2006 | Lydon et al. | 463/9 |
| 2006/0282302 A1* | 12/2006 | Hussain | 705/9 |
| 2007/0043588 A1* | 2/2007 | Muir | 705/1 |
| 2007/0198558 A1* | 8/2007 | Chen | 707/101 |
| 2007/0198977 A1* | 8/2007 | Abernethy et al. | 718/100 |
| 2007/0250378 A1* | 10/2007 | Hughes et al. | 705/11 |
| 2008/0059967 A1* | 3/2008 | Matsui et al. | 718/102 |
| 2008/0066072 A1* | 3/2008 | Yurekli et al. | 718/104 |
| 2008/0082388 A1* | 4/2008 | Fishman | 705/8 |
| 2008/0127093 A1* | 5/2008 | Fernandez-Ivern et al. | 717/124 |
| 2008/0195449 A1* | 8/2008 | Snapkauskas et al. | 705/8 |
| 2009/0025004 A1* | 1/2009 | Barnard et al. | 718/104 |
| 2009/0204471 A1* | 8/2009 | Elenbaas et al. | 705/9 |
| 2009/0210282 A1* | 8/2009 | Elenbaas et al. | 705/9 |
| 2010/0305991 A1* | 12/2010 | Diao et al. | 705/7 |

* cited by examiner $P(project) = P(task_1) * P(task_2) * \ldots P(task_n)$

SYSTEM AND METHOD FOR PROJECT MANAGEMENT AND COMPLETION

RELATED APPLICATIONS

This application claims priority to and the benefit of U.S. Provisional Patent Application Ser. No. 61/103,735, filed on Oct. 8, 2008, entitled "SYSTEM AND METHOD FOR PROJECT MANAGEMENT AND COMPLETION,".

TECHNICAL FIELD

This invention relates to computer-based methods and systems for facilitating the management and completion of projects.

BACKGROUND INFORMATION

Background

Projects, and especially software development projects, routinely fail to be completed within predicted cost and time constraints. This is typically attributed to the uncertainty inherent in human activity, and particularly innovation or development activities.

Some may attempt to estimate the uncertainty in projects by considering the projects to be networks of sub-projects, and estimating the uncertainty in each of the subprojects. For example, a risk analysis approach is sometimes used to estimate the duration of a project taking into account the specific possible causes of uncertainty in completing the project subtasks.

It can be difficult, if not impossible, however, to identify in advance all potential causes of uncertainty, particularly when individual resources are relied upon to complete specific tasks. It therefore remains difficult to complete projects within anticipated cost and time constraints.

SUMMARY OF THE INVENTION

In general, a project is considered to be made up of separate tasks, where a task is a scheduled activity with one or more specified deliverables and/or deadlines. To increase the probability of project success, some tasks may be designated to have multiple, redundant resources undertake them.

In some embodiments, a system for planning and executing projects includes a model specification module for creating a project model comprising tasks and dependencies, a task complexity module for determining the complexity of the tasks and for modifying the tasks to maintain the complexity within predetermined bounds, a redundant task designation module for designating one or more tasks to be redundant tasks, and a task market module for executing the redundant tasks with redundant resources.

In some embodiments, redundant tasks are identified as such in the model by a determination of the task type, or by facilitating evaluation. In some embodiments, redundant tasks are performed by conducting competitions. In some embodiments, redundant tasks are performed by engaging more than one individual each to perform the task. In some embodiments, some tasks are redundant, and other tasks are not performed redundantly. In some embodiments, tasks are designated to be performed redundantly if the probability of an assigned resource assigned completing the task is below a predetermined threshold. In some embodiments, the model is displayed such that probabilities of task completion below a threshold are designated with a visual indicator. In some embodiments, the model is displayed such that tasks designated as redundant are designated with a visual indicator.

In some embodiments, tasks may be identified that are candidates for performance by redundant resources. In some cases, this may involve identifying a task of sufficient granularity that the likelihood that the task will be performed successfully by redundant resources is greater than a desired threshold value. In some cases, this may involve identifying a task that is of sufficient complexity to avoid inefficiency. In some cases, this may involve identifying a task of sufficient priority that it will be worth additional cost, expense, or effort (if any) to involve redundant resources.

The systems and methods described can be implemented as software running on computers and other devices.

In general, in another aspect, a method for planning and executing projects includes specifying predetermined task types, allowing projection managers to specify a model for a project by identifying tasks and dependencies, wherein each task is designated to be of one of the specified predefined task types, calculating the likelihood of success of each task based on historical data for the task type, designating tasks as candidates to be undertaken by redundant resources based on the likelihood of success, allowing project managers to complete the project using the model by designating that one or more individual resources participating in a task market undertake each task; and tracking the success of each individual resource that undertakes a task in order to update the historical data. A task type may include a single task type or a group of similar task types.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
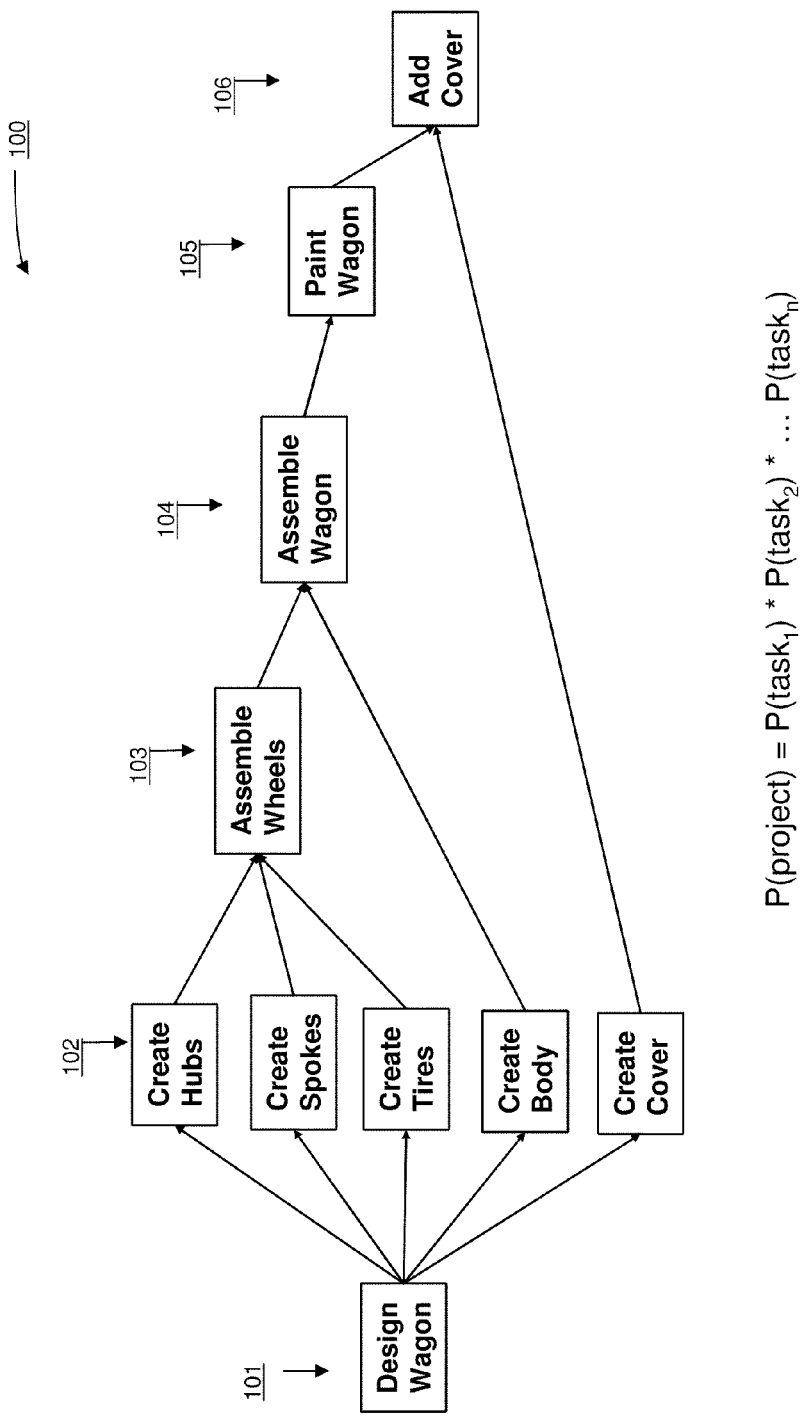
FIG. 1 is a block diagram providing an illustrative example of a project.

Referring to FIG. 1, a block diagram of a simplified, illustrative project 100 to construct a wagon has a number of tasks 101-106, which include designing the wagon, creating hubs, spokes, tires, body, and cover, assembling the wheels from hubs, spokes, and tires, assembling the wagon from wheels and body, and adding cover. A first task 101 is to design the wagon. A next task 102 involves creating the parts of the wagon, described in this example as the hubs, spokes, tires, body, and cover. Further tasks are to assemble the wheels 103, assemble the wagon 104, paint the wagon 105, and add the cover 106. A dependency of one task on another is illustrated by a line connecting the tasks. It should be repeated that this is a simplified project, with an exemplary number of tasks 101-106, used for illustrative purposes. In this example, the project can not be completed until all of the tasks are completed, and some tasks are dependent on others.

For this illustrative project, all tasks must complete successfully for the project to complete successfully. In this case, the probability of project failure increases with the number of tasks, and particularly with the number of tasks that are dependent on other tasks. For example, if success is defined as completing on time, on budget, and meeting the specifications for the project, a probability of success of the project 100, P(project) can be defined as the probability that the project completes on time, on budget, and the wagon meets the specifications. The successful completion of the project depends on the success of each task, so the probability of success for the project is the result of multiplying the probabilities of success of each task.

$$P(\text{project}) = P(\text{task}_1) * P(\text{task}_2) * P(\text{task}_3) * \ldots P(\text{task}_n)$$

In this simplified example, there are 10 tasks. If each of the 10 tasks have an 80% chance of success (i.e., P(task)=80%), this demonstrative project will have a probability of all projects succeeding of 10.7%:

$$P(\text{project}) = 0.80 * 0.80 * 0.80 * \ldots 0.80 = (0.80)^{10} = 10.7\%.$$

Thus, even with an 80% chance of each task succeeding, the likelihood of successful completion of all of the wagon tasks is 10.7%. This is what makes even a simple project hard to complete successfully. Even if some tasks can finish successfully, they may not be able to make up for the unsuccessful projects.

If the probability of success of each task increases to 90%, the probability of success of the project only increases to 34.8%

$$P(\text{project}) = 0.90 * 0.90 * 0.90 * \ldots 0.90 = (0.90)^{10} = 34.8\%.$$

If the probability of success of each task increases to 95%, the probability of success of the project only increases to 59.9%

$$P(\text{project}) = 0.95 * 0.95 * 0.95 * \ldots 0.95 = (0.95)^{10} = 59.9\%.$$

If the probability of success of each task increases to 99.2%, the probability of success of the project increases to 92.3%

$$P(\text{project}) = 0.992 * 0.992 * 0.992 * \ldots 0.992 = (0.992)^{10} = 92.3\%.$$

It should be understood that for most projects, the probabilities for success of each task will not be the same, and it may be possible in some cases, by including sufficient time or resources in a project plan to compensate for failures of individual tasks to succeed. The concept illustrated in the simplified example is important, however, in that it demonstrates that complicated projects can fail because if each of the tasks that are depended on have to succeed, something unexpected (even of low probability) in one of the tasks can derail the entire project.

Figure 2:
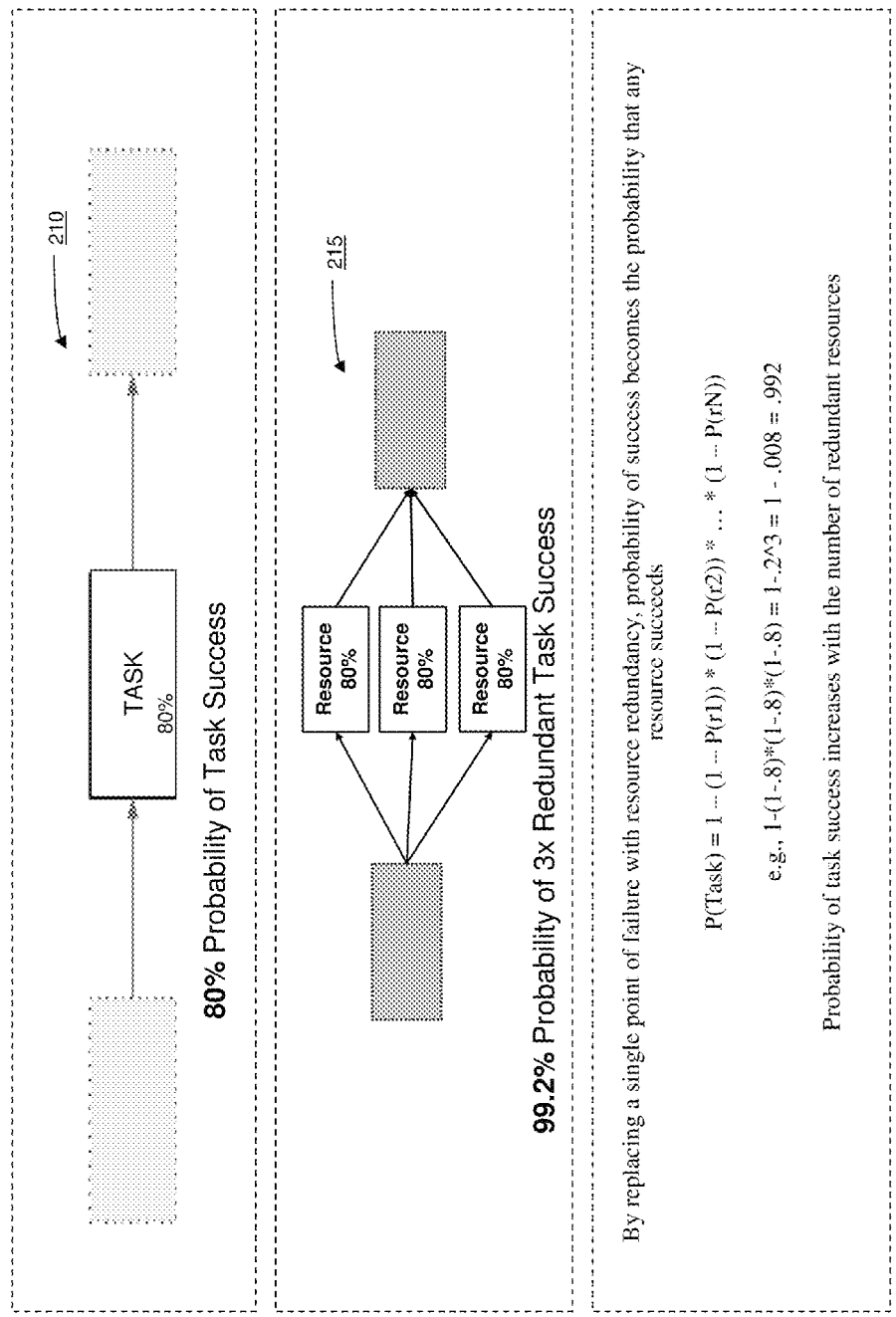
FIG. 2 is a block diagram illustrating by example the probability of success of a task when redundant resources are engaged.

Referring to FIG. 2, consider that for each task in a project, such as, for example, the tasks shown in the example of FIG. 1, if a resource is designated to a task, the probability of success of the task will depend on the work of that single resource. If the resource has undertaken that type of task previously, it may be possible to make a reasonable estimate of the probability of successful completion of the task by that resource. It also may be possible to make an estimate using historical data regarding similarly positioned resources. While the historical data may not show any unexpected problem with the individual working on the task, historical data may reveal the effect of difficulties that individuals encounter a small percentage of the time, even if not yet encountered. Continuing the first example from FIG. 1, if a single resource is assigned, and that single resource has an 80% probability of success, the task will have an 80% probability of success. This is illustrated in the top portion of the FIG. 210.

If each task is undertaken by two other similarly situated resources in addition to the one resource, so that there are redundant resources each of whom are attempting separately to complete the task, and each of those individual resources have an 80% probability of success, the task will have a 99.2% probability of success. This is because replacing a single resource with redundant resources means that the probability of success is the probability that any of the resources succeeds. If P(task) is the probability that a task succeeds, and P(resource$_x$) is the probability that resource$_x$ succeeds, then:

$$P(\text{task}) = 1 - ((1 - P(\text{resource1})) * (1 - P(\text{resource2})) * \ldots (1 - P(\text{resource}_n)))$$

For example, with three redundant resources that each have a probability of success of 80%, then the probability of success P(task)=99.2%.

$$P(\text{task}) = 1 - ((1-0.80) * (1-0.80) * (1-0.80)) = 1 - 0.008 = 0.992 = 99.2\%$$

The use of redundant resources to each work on a task can dramatically increase the likelihood that the task will be completed successfully. As described with respect to the simplified project example of FIG. 1, where each task must be completed successfully for the project to complete successfully, increasing the probability that each task will be completed from 80% to 99.2% increases the probability of overall project success from 10.7% to 92.3%. As a general concept, it is possible to increase the likelihood of success of a project by allocating redundant resources. To make use of redundant resources, it is necessary to manage the project such that the redundant tasks are well-defined, and have specified inputs and outputs, such that redundant resources may work on the tasks at the same time. For some projects, allocating redundant resources may require manufacture or otherwise obtaining more inputs than would otherwise be needed (e.g., enough wheels, spokes, and tires in the example of FIG. 1 to allow for redundant resources to assemble wheels). When the tasks have intellectual assets as inputs, however, there is no need to manufacture or purchase additional parts; only to provide the incentives for multiple individuals to participate.

Figure 3:
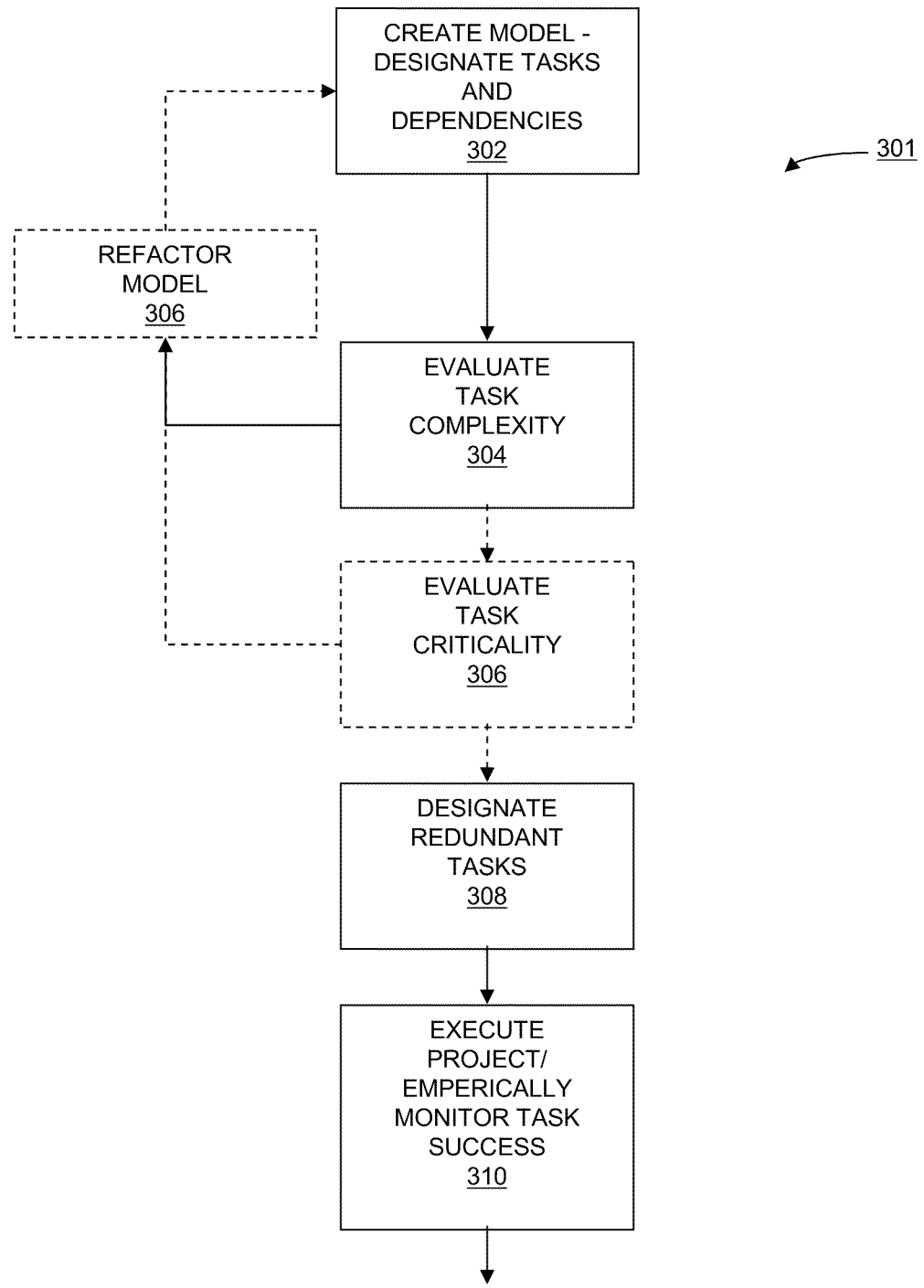
FIG. 3 is a flowchart illustrating an embodiment of the invention.

Referring to FIG. 3, in some embodiments, a method for increasing the probability of project success 301 is implemented by creating a model 302 of the project. The model may include information about tasks that are needed to complete the project, and dependencies among the tasks. Successful execution of each task in the model may result in successful completion of the project.

Creating the model may include identifying tasks to be completed. Tasks may be identified in any suitable manner. In some embodiments, tasks may be identified by determining the deliverables that are required for the completion of the project, and assigning a task for the delivery of each deliverable. Deliverables that are needed to produce those deliverables may be determined, and so on. In some cases, this determination of the tasks may involve architecture and/or design that takes place during the project. For example, a first phase of the project may be to identify requirements and create and/or architecture for a software product. When architecture is complete, a series of tasks may be specified to develop the specified architecture.

For example, if the final deliverables is a web-based software application for inventory tracking, the final deliverables may include the software program, the test plan, test software, documentation, and so on. Each of the deliverables may have tasks to create them, and deliverables required for those tasks.

In creating the model, dependencies may be identified. For example, if a first task (e.g., task X) has as a deliverable an item which is required as input for one or more other tasks (e.g., task Y), the other tasks (task Y) are dependent on the first task (task X).

The method may include evaluating the complexity of each task 304 and optionally modifying 306 the tasks so that they have suitable complexity. In some embodiments, each task is sized such that an individual resource (e.g., one person) has an acceptable likelihood of successfully completing the task in a designated amount of time, for example so that the probability of task completion by an individual resource is above a predetermined threshold. In such embodiments, if a task requires interaction between two or more individuals, the task may be divided so that each task can have one responsible individual. If the task is too big, for example, if there are too many sub-tasks, the task may be split into two or more tasks. For example, a sub-task threshold may be established, and tasks divided if the number or types of sub-tasks are greater than a threshold. The complexity also may be evaluated empirically, by determining the success rate of individuals working on similar tasks. If the probability of task completion by an individual resource is not above the desired threshold, the task may be divided.

If a task is divided, the appropriate changes may be made to the model in a re-factoring process 306, such that the modified tasks and dependencies are specified as desired, and the re-factored model may be reviewed iteratively.

In some embodiments, evaluating task complexity also may involve evaluating whether tasks may be combined. For example, in some embodiments, if two adjacent tasks can be performed by an individual with the same skill set as a single task with a sufficiently high probability of success in an appropriate time frame, the tasks may be combined. Combining tasks reduces overhead, and has an efficiency benefit. If one task is dependent on the other, this weighs in favor of combining the tasks.

In some cases, however, there may be quality and/or security benefits to having two different individuals separately perform two tasks, even if they are dependent on each other. For example, if the tasks require different skill sets, there may be significant benefit from having different individuals work on each task. As other example, if having different individuals work on each task puts checks and balances into place that make it harder to deliberately or inadvertently create security problems, that weighs in favor of keeping the tasks separate. For example, benefits obtained by having one individual design a software component and having another individual develop the code for the software component include the benefit of having individuals with different skill sets working on the parts that they do best, the security benefit of making it harder to insert nefarious code without it being identified, and the code integrity benefit of having a developer test the design by building it, as well as other benefits.

In some embodiments, the method optionally includes evaluating the criticality of a task 308. For example, based on the identification of dependencies when creating the model 302, it may be possible to identify tasks on which a number of other tasks depend. In some cases, each task in the project model is assigned a designator that is related to the degree of criticality. For example, the first tasks in the project typically have more tasks that are dependent on them than tasks later in the project, and so they will have different designators. Also, it may be apparent when constructing the project model that some tasks are more critical than others, and that there is a "critical path" or critical paths for successful project completion. Degree of criticality of the tasks may be taken into account when designating redundant tasks.

The method includes designating one or more tasks to be redundant tasks 308. This may be done for each of the tasks, so that each task is performed redundantly. This may be done for some of the tasks, based, for example, on the likelihood of success of task completion. Tasks with a lower likelihood of task completion may be performed redundantly, so as to increase the likelihood of success. Designation as a redundant task may involve configuring a market module so as to allow for undertaking of a task by multiple people. The number of people may be limited to a number determined based on the likelihood of success. (If the task is to be completed by competition, described further below, a competition prize may be set based on the number of redundant resources desired.)

In some embodiments, in which resources are paid based on their working time, adding redundancy may add significant cost. Depending on the project, and the ultimate cost of failure, the added redundancy still may be worthwhile even in such cases. If the likelihood of success is known, it may be possible to designate an optimal number of redundant resources, so that the greatest cost/benefit is obtained. Building redundancy into a project plan can ultimately save money, because the project completes successfully.

In some embodiments, a competition model is used, in which multiple resources develop and submit a deliverable for a prize or prizes. In some cases, this may make the cost more expensive and incur more overhead than the cost of one excellent resource being paid to perform the task, but it greatly increases the likelihood of project success. In such cases, it may be possible to use the model to create a list or series of competitions, which can then be implemented by a competition system.

In some embodiments, it is possible to accurately predict the likelihood of successful completion of a task based on individuals' past performance. If individuals undertake tasks of a size, type, and skill requirements that are similar to tasks previously undertaken. Statistics may be kept about the performance of individuals in undertaking the tasks. For example, these statistics may include the number of tasks attempted, the number of successful completions, the evaluated quality of the deliverables, and/or any other suitable statistics. The ratio of the number of tasks attempted divided by the number of successful completions may be a good proxy for the likelihood that the individual will be able to complete a similar task. In some cases, this ratio may be limited by time, or broken out by project type.

In some embodiments, tasks of particular size, type, and skill requirements are specified. In many cases, for certain types of projects (as a few non-limiting examples: software development, graphic design, document/book publication, web site design, document translation, videos, music, educational material, legal documents, building and landscape design and architecture, medical documents, etc.) a standard set of tasks may be created such that each task in a project has a predefined task type, and the project may be completed by assigning each task to a predefined task type. Each task type would have a parameter range, such as timing, required deliverables, and so forth that is appropriate to that type. The benefit of having the predefined task type is that it allows for metrics to determined regarding the likelihood of success of tasks of that task type, and also for the creation of expertise in the completion of that type of task.

An online marketplace maybe created for the posting and creation of such tasks. Such a marketplace may include a capability for those who have tasks to be completed to submit the tasks for completion by individuals. Such a marketplace may include a capability to engage one or more individuals to undertake the task. Such a marketplace may facilitate communication of deliverables, review of deliverables and/or payment for deliverables. In some embodiments, a marketplace also includes a capability to engage more than one individual for the task.

In a marketplace environment, and particularly where the marketplace includes a facility to differentiate among different types of tasks, it is possible to integrate performance statistics into the task fulfillment process. For example, the response, timing, and quality of work may be specified and/or judged, for example by a task requester, by one or more reviewers, by a peer group and so forth. With such statistics, the rate at which a specific individual has delivered acceptable work product in a particular task type may be determined, and this rate may be used as the probability that that particular individual will deliver. Likewise, aggregated statistics may be used to determine the likelihood that average individuals in the market will complete that type of task. In some cases, this data may give insight as to the effect of pricing, timing, and so forth in the successful completion of that type of task.

Figure 4:
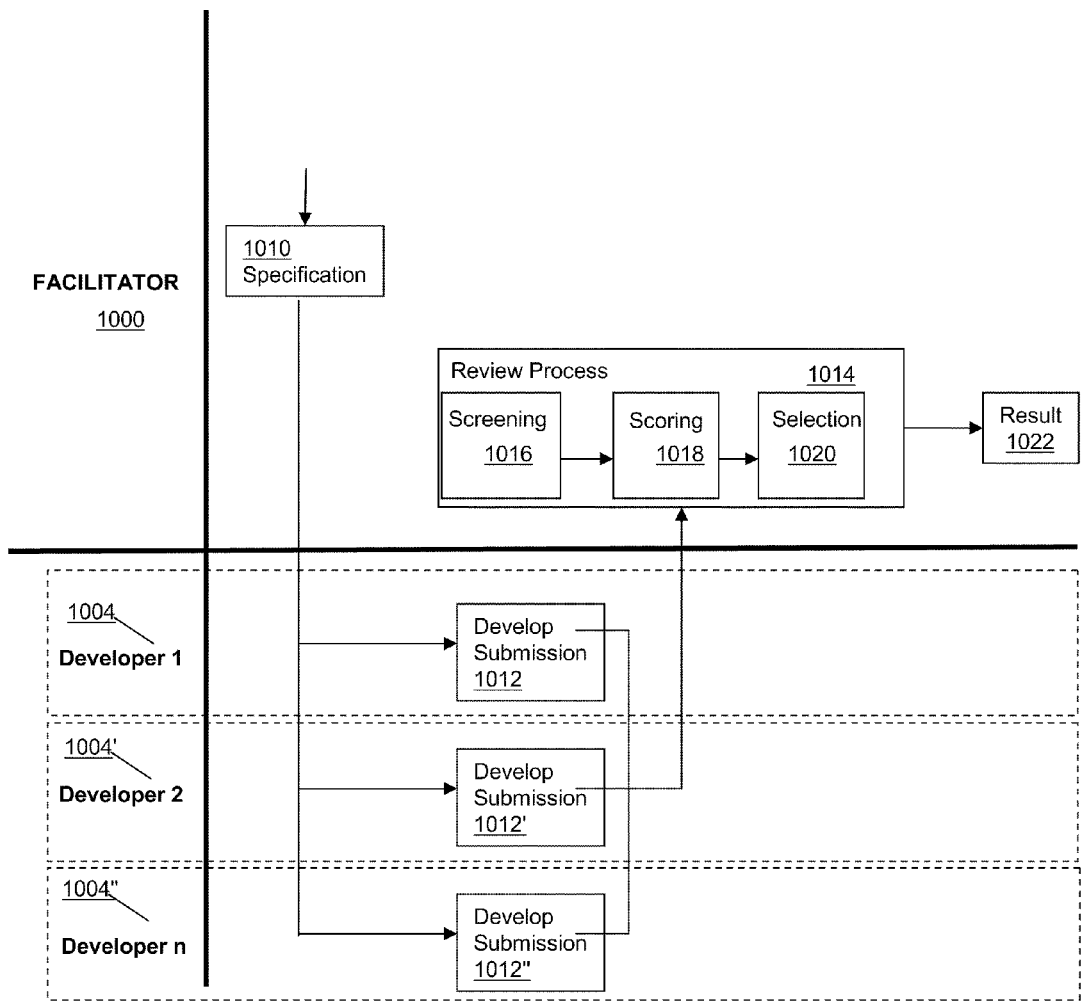
FIG. 4 is block diagram illustrating by example a competition for engaging redundant resources according to an embodiment of the invention.

In some embodiments, the marketplace is a competition marketplace, with one or more competitions held for the development of an asset. In such a competition, a number of individuals may compete to develop the asset. A competition that attracts multiple skilled competitors will result in the redundancy described. The number of competitors needed for successful completion again may be determined from the past delivery history of the competitors and the average likelihood that a number of competitors Referring to FIG. 4, in one embodiment, one possible generalized implementation of a contest for the development of an asset is shown. The asset may be any sort or type of asset that may be developed by an individual or group. As non-limiting illustrative examples, an asset may be a software program, logo, graphic design, specification, requirements document, wireframe, static prototype, working prototype, architecture design, component design, implemented component, assembled or partially-assembled application, testing plan, documentation, language translation, and so on.

In some embodiments, the development process is monitored and managed by a facilitator 1000. The facilitator 1000 can be any individual, group, or entity capable of performing the functions described here. The facilitator 1000 may be an administrator. In some cases, the facilitator 1000 can be selected from a the distributed community of contestants based on, for example, achieving exemplary scores on previous submissions, or achieving a high ranking in a competition. In other cases, the facilitator 1000 may be appointed or supplied by an entity requesting the development, and thus the entity requesting the competition oversees the competition.

The facilitator 1000 has a specification 1010 for an asset to be developed by competition. In general, a specification 1010 is intended to have sufficient information to allow contestants to generate the desired asset. In some cases, the specification 1010 may include a short list of requirements. In some cases the specification may include the result of a previous competition, such as a design, wireframe, prototype, and so forth. In some cases, the specification may be the result of a previous competition along with a description of requested changes or additions to the asset. The facilitator 1000 may review the specification 1010, and format or otherwise modify it to conform to standards and/or to a development methodology. The facilitator 1000 may in some cases reject the specification for failure to meet designate standards. The facilitator 1000 may mandate that another competition should take place to change the specification 1010 so that it can be used in this competition. The facilitator 1000 may itself interact with the entity requesting the competition for further detail or information.

The facilitator 1000 may specify rules for the competition. The rules may include the start and end time of the competition, and the awards(s) to be offered to the winner(s) of the competition, and the criteria for judging the competition. There may be prerequisites for registration for participation in the competition. Such prerequisites may include minimum qualifications, rating, ranking, completed documentation, legal status, residency, location, and others. In some cases, the specification may be assigned a difficulty level, or a similar indication of how difficult the facilitator, entity, or other evaluator of the specification, believes it will be to produce the asset according to the specification. Some of the specification may be generated automatically based on the type of competition.

The specification is distributed to one or more developers 1004, 1004', 1004" (generally, 1004), who may be members, for example, of a distributed community of asset developers. In one non-limiting example, the developers 1004 are unrelated to each other. For example, the developers may have no common employer, may be geographically dispersed throughout the world, and in some cases have not previously interacted with each other. As members of a community, however, the developers 1004 may have participated in one or more competitions, and/or have had previously submitted assets subject to reviews. This approach opens the competition to a large pool of qualified developers. As another example, the developers may be employed by or have a relationship with a particular entity.

The communication can occur over a communications network using such media as email, instant message, text message, mobile telephone call or text message, a posting on a web page accessible by a web browser, through a news group, facsimile, or any other suitable communication. In some embodiments, the communication of the specification may include or be accompanied by an indication of the rules including without limitation the prize, payment, or other recognition that is available to the contestants that submit specified assets. In some cases, the amount and/or type of payment may change over time, or as the number of participants increases or decreases, or both. In some cases submitters may be rewarded with different amounts, for example a larger reward for the best submission, and a smaller reward for second place. The number of contestants receiving an award can be based on, for example, the number of contestants participating in the competition and/or other criteria. Rewards may be provided for ongoing participation in multiple competitions, for example as described in co-pending U.S. patent application Ser. No. 11/410,513 to Hughes et al., filed May 1, 2006, entitled System and Method for Compensating Contestants.

The recipients 1004 of the specification can be selected in various ways. In some embodiments all members of the community have access via a web site. In some embodiments, member may register for a contest to gain access. In some embodiments, members of the community may have expressed interest in participating in a particular type of development competition, whereas in some cases individuals are selected based on previous performances in competitions, prior projects, and/or based on other methods of measuring programming skill of a software developer. For example, the members of the community may have been rated according to their performance in a previous competition and the ratings may be used to determine which programmers are eligible to receive notification of a new specification or respond to a notification. The community members may have taken other steps to qualify for particular competitions, for example, executed documentation such as a non-disclosure agreement, provided evidence of citizenship, submitted to a background check, and so forth. Recipients may need to register for a competition in order to gain access.

In one embodiment, a facilitator 1000 moderates a collaborative discussion forum among the various participants to answer questions and/or to facilitate development by the contestants. The collaborative forum can include such participants as facilitators, developers, customers, prospective customers, and/or others interested in the development of certain assets. In one embodiment, the collaboration forum is an online forum where participants can post ideas, questions, suggestions, or other information. In some embodiments, only a subset of the members can post to the forum, for example, participants in a particular competition or on a particular team.

Upon receipt of the specification 1010, one or more of the developers 1004 each develop assets to submit (shown as 1012, 1012' and 1012") in accordance with the specification 1010. The development of the asset can be done using any suitable development system, depending, for example, on the contest rules and requirements, the type of asset, and the facilities provided. For example, there may be specified tools and/or formats that should be used.

Once a developer 1004 is satisfied that her asset meets the specified requirements, she submits her submission, for example via a communications server, email, upload, facsimile, mail, or other suitable method.

To determine which asset will be used as the winning asset as a result of the contest, a review process 1014 may be used. A review can take place in any number of ways. In some cases, the facilitator 1000 can engage one or more members of the community and/or the facilitator and/or the entity requesting the asset. In some embodiments, the review process includes one or more developers acting as a review board to review submissions from the developers 1004. A review board preferably has a small number of (e.g., less than ten) members, for example, three members, but can be any number. Generally, the review board is formed for only one or a small number of related contests, for example three contests. Review boards, in some embodiments, could be formed for an extended time, but changes in staffing also can help maintain quality. In some embodiments, where unbiased peer review is useful, the review board members are unrelated (other than their membership in the community), and conduct their reviews independently. In some embodiments, reviewers do not know the identity of the submitter at the time that the review is conducted.

In some embodiments, one member of the review board member is selected as a primary review board member. In some cases, a facilitator 1000 acts as the primary review board member. The primary review board member may be responsible for coordination and management of the activities of the board.

In some embodiments, a screener, who may be a primary review board member, a facilitator, or someone else, screens 1016 the submissions before they are reviewed by the (other) members of the review board. In some embodiments, the screening process includes scoring the submissions based on the degree to which they meet formal requirements outlined in the specification (e.g., format and elements submitted). In some embodiments, scores are documented using a scorecard, which may be a document, spreadsheet, online form, database, or other documentation. The screener may, for example, verify that the identities of the developers 1004 cannot be discerned from their submissions, to maintain the anonymity of the developers 1004 during review. A screening review 1016 may determine whether the required elements of the submission are included (e.g., all required files are present, and the proper headings in specified documents). The screening review can also determine that these elements appear complete.

In some embodiments, the screening 1016 includes initial selection by the entity that requested the competition. For example, if the competition is for a wireframe, the entity may select the wireframes that seem to be the best. This smaller group may then go on to the next step.

In some embodiments, the screener indicates that one or more submissions have passed the initial screening process and the reviewers are notified. The reviewers then evaluate the submissions in greater detail. In preferred embodiments, the review board scores the submissions 1018 according to the rules of the competition, documenting the scores using a scorecard. The scorecard can be any form, including a document, spreadsheet, online form, database, or other electronic document. There may be any number of scorecards used by the reviewers, depending on the asset and the manner in which it is to be reviewed.

In some embodiments, the scores and reviews from the review board are aggregated into a final review and score. In some embodiments, the aggregation can include compiling information contained in one or more documents. Such aggregation can be performed by a review board member, or in one exemplary embodiment, the aggregation is performed using a computer-based aggregation system. In some embodiments, the facilitator 1000 or a designated review board member resolves discrepancies or disagreements among the members of the review board.

In one embodiment, the submission with the highest combined score is selected as the winning asset 1020. The winning asset may be used for implementation, production, or for review and input and/or specification for another competition. A prize, payment and/or recognition is given to the winning developer.

In some embodiments, in addition to reviewing the submissions, the review board may identify useful modifications to the submission that should be included in the asset prior to final completion. The review board documents the additional changes, and communicates this information to the developer 1004 who submitted the asset. In one embodiment, the primary review board member aggregates the comments from the review board. The developer 1004 can update the asset and resubmit it for review by the review board. This process can repeat until the primary review board member believes the submission has met all the necessary requirements. In some embodiments, the review board may withhold payment of the prize until all requested changes are complete.

In some embodiments, a portion of the payment to the developer 1004 is withheld until after other competitions that make use of the asset are complete. If any problems with the asset are identified in the further competitions, these are provided to the reviewer(s) and the developer 1004, so that the requested can be made by the developer 1004.

There also may be prizes, payments, and/or recognition for the developers of the other submissions. For example, the developers that submit the second and/or third best submissions may also receive payment, which in some cases may be less than that of the winning contestant. Payments may also be made for creative use of technology, submitting a unique feature, or other such submissions. In some embodiments, the software developers can contest the score assigned to their submission.

It should be understood that the development contest model may be applied to different portions of work that are required for the development of an overall asset. A series of development contests is particularly suitable for assets in which the development may be divided into stages or portions. It can be beneficial in many cases to size the assets developed in a single competition such that work may be completed in several hours or a few days. The less work required to develop a submission, the lower the risk for the contestants that they will not win, and increased participation may result.

Figure 5:
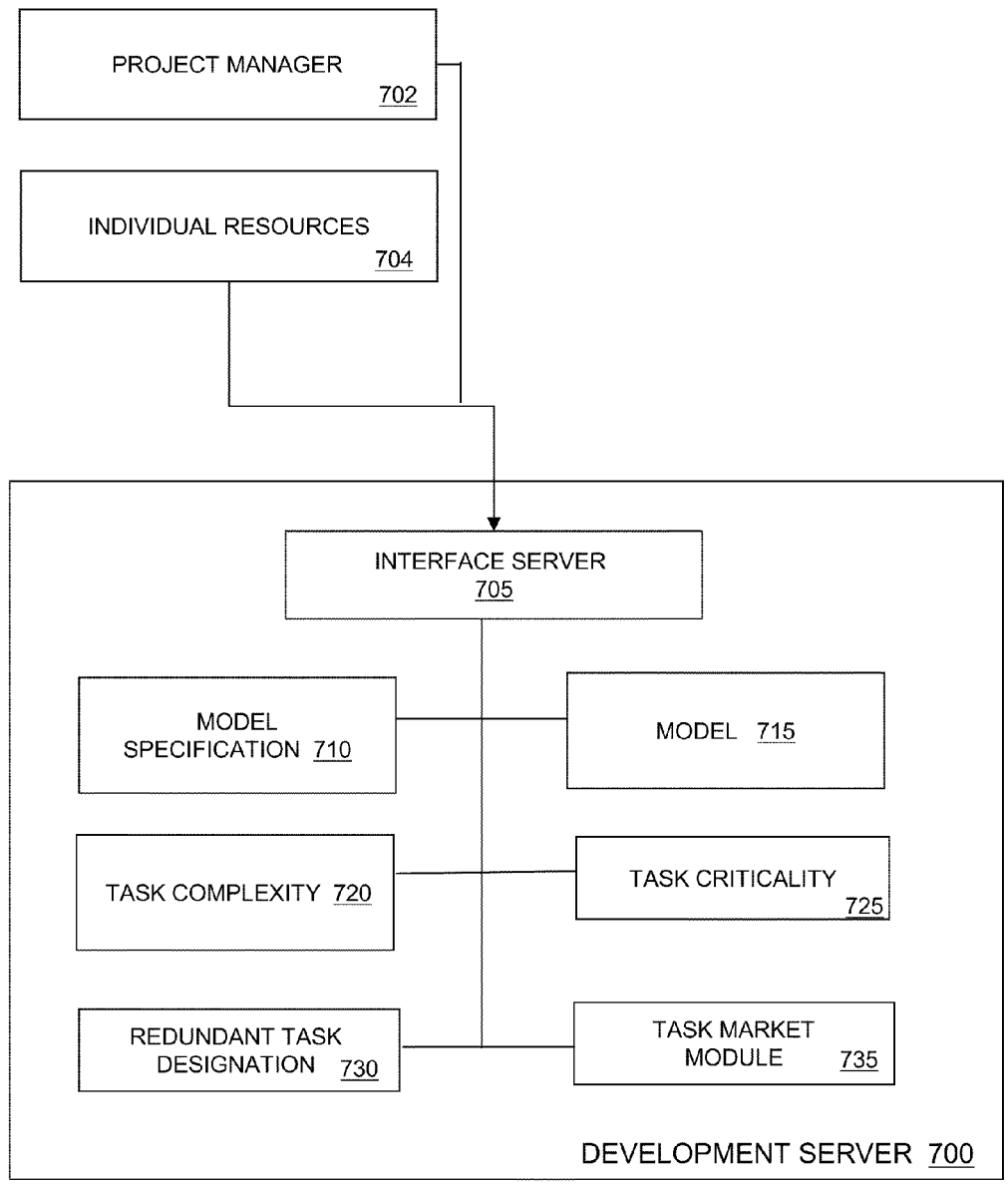
FIG. 5 is block diagram of a system implementation according to an embodiment of the invention.

Referring to FIG. 5, a development server 700 according to an embodiment of the invention may be used to implement the method described above and variations thereof.

In some embodiments, the development server 700 includes an interface server 705. The interface server 705 provides an interface for communication with users of the system, including without limitation individual resources 704 and project managers 702. The project managers have projects and tasks to be completed, and the individual resources 704 may be capable and/or have the skills to complete the tasks. The interface server 705 may be a web server, such as the APACHE web server, or MICROSOFT IIS with plug-ins and/or code to communicate with the other modules 710-735. The interface server may, in some embodiments, be used to implement a model-view-controller architecture.

The server 700 may include a model specification module, which allows a project manager 702 to specify a model for a project. Specifying the project model may include specifying tasks and dependencies. In some embodiments, the tasks may be selected from types of tasks that are specified on the server, with specified timing, deliverables, review criteria and/or scorecards, etc. For example, in the case of software development, the tasks may include (but are not limited to) a requirements generation task, a user interface design task, a storyboard design task, an architecture task, a component design task, a component development task, a component assembly task, a test case generation task, a documentation generation task, a bug fix task, and so on, and there may be more than one of some types of tasks. In some embodiments, tasks that are not predetermined may be specified by such parameters as timing and deliverables. Parameters such as skills needed, price, descriptions of the specific tasks, and so on also may be specified.

In some embodiments, the model specification module aids in the specification of the model by facilitating the identification of deliverables that are required for the completion of a project, and assigning a task for the delivery of each deliverable. Deliverables that are needed to produce those deliverables may be specified, and so on. In some cases, this determination of the tasks may involve architecture and/or design of some project deliverables, in order to determine other tasks that will require completion. A model thus may be updated as the project progresses. For example, an architecture task may have as a deliverable the specification of components, which components may be developed from scratch, or already existing. If they need to be developed, tasks will be specified. In some cases, the number and availability of components may not be known until the architecture task is complete, and, for example, a model may be updated following architecture.

The model module 715 stores and provides access to a representation of the project. The model module 715 may include or have access to a data store and/or database to store the model for each project. Privileges to access and/or edit the model may be limited based by user, customer group, and so on.

The server 700 may include a task complexity module 720. The task complexity module may help a project manager 702 to determine tasks that may be too complex, or that may be not complex enough and are good candidates for combination. In some embodiments, the task complexity module reviews the tasks in the module, and based on the type, determines the probability that the tasks will be completed successfully by an individual resource. If the likelihood, based on historical data for similar tasks, is not sufficiently high, the task complexity module may signal to the project manager that the task is a candidate for division. If the likelihood that the task will be completed successfully is very high, it may be possible to combine the task with another task, and the task complexity module may determine whether there are tasks that are similar or related, and that may be combined, still with a reasonable expectation of success. Again the project manager may look at the task details to determine whether combination is appropriate. In some cases, the task complexity module may solicit input from an administrator regarding the complexity of a task. In some embodiments, the task complexity module may review community feedback (e.g., from a marketplace) regarding task complexity. In some embodiments, the task complexity module may provide a visual indicator regarding tasks whose complexity is above a particular threshold. In some embodiments, the task complexity module may provide an alert when there are tasks who are candidates for combination, based on task type and/or complexity.

The server 700 may include a task criticality module 725 which will review the dependencies in the model, and determine the criticality of the specified tasks. Some tasks may be more critical than others, and this may be taken into account. Task criticality may be determined, for example, by the number of dependencies on the task. Task criticality may be determined, for example, by the number of dependencies on which the final products are dependent. Task criticality may be determined, for example, by whether the task is on a critical path, that is, a series of tasks that controls the finish date of the project so that when the last task in the critical path is complete, the project is also complete. This may be determined by reviewing the dependencies designated in the model. In some embodiments, the task criticality module may signal to the project manager if there are tasks that have a high criticality, but have a low probability of being completed. This situation likely requires attention of the project manager. The criticality module may allow a project manager to manually adjust criticality designation for a task.

The server 700 may include a redundant task designation module 730. The redundant task designation module 730 may determine, based on the probability that tasks will complete (as determined, for example, by the task complexity module) and/or the criticality of a task, whether a task is a candidate for redundancy. The redundant task designation module 730 may indicate the number of individuals that would be needed (based, for example, on average success statistics) to have a very high probability of success (e.g., 99.5%). The redundant task designation module may be configured to automatically designate tasks as redundant, based on the probability/criticality profile. The redundant task designation module may be configured to signal to the project manager, for example with a visual indicator, tasks that are candidates for undertaking with multiple resources.

The server 700 may include a task market module 735, which provides an interface for tasks to be communicated to individual resources, and for resources to indicate interest in participating in the task. Any suitable type of task market may be used. For example, there may be auctions for the resources and/or auctions for the opportunity to perform the task (where the auction may be for cost, timing, or other parameters). There may be a fixed cost or a variable cost, prizes and/or bonuses for completion, review by the project manager, peer review, review by other team members, or other types of review. In some embodiments, the task market module includes a competition system, and the tasks are implemented as competitions, for example as described with reference to FIG. 4.

In various embodiments, metrics on the performance of the individual resources in performing the tasks may be collected, in order to make realistic determinations about the likelihood of successful completion of similar tasks. This metrics may include rating, ranking, tasks undertaken, tasks successfully completed, reliability (e.g., likelihood of successful completion) and so on.

It should be understood that a development system with the features described could also be a client-server system. For example, a client application may include one or more of the modules 705-735 described, with logic and/or data stored on a local or remote system. The features described may be provided as add-ons and/or integrated into commercially available project planning systems, such as MICROSOFT PROJECT, METIER WORKLENZ, SAP XRPM, ORACLE PRIMAVERA, and so on.

Ratings

In some embodiments in which multiple resources compete, ratings are kept for each of the resources, so that members of the community can see where they stand with respect to each other. The rating also may be used as a measure of skill. The rating may be particularly useful when applied to participants in a specific type or category of tasks. For example, a resource may have one rating in user interface design, and another rating in test case generation tasks.

In some embodiments, the rating system that is used is as follows.

The statistics of Rating, Volatility, and Number of times previously rated are kept about each resource. Before participating in a competition, new resource's ratings are provisional. After a competition, the algorithm below is applied to the resources participating in the competition.

First, the ratings of resources who have previously competed are calculated, with new resources' performances not considered. Second, new resources are given a rating based on their performance relative to everyone in the competition. In some cases, resources may be assigned a "color" based on their rating, where red is for 2200+, yellow is for 1500-2199, blue is for 1200-1499, green is for 900-1199, and grey is for 0-899.

After each competition, each resource who participated in the competition is re-rated according to the following algorithm. The average rating of everyone in the competition is calculated:

$$AveRating = \frac{\sum_{i=1}^{NumCoders} Rating_i}{NumCoders}$$

Where NumCoders is the number of resources in the competition and Rating is the rating without the volatility of the resource in the competition before the competition.

The competition factor is calculated:

$$CF = \sqrt{\frac{\sum_{i=1}^{NumCoders} Volatility^2}{NumCoders} + \frac{\sum_{i=1}^{NumCoders}(Rating_i - AveRating)^2}{NumCoders - 1}}$$

Where Volatility is the volatility of the resource in the competition before the competition.

The Win Probability is estimated:

$$WP = 0.5\left(erf\left(\frac{Rating1 - Rating2}{\sqrt{2(Vol1^2 + Vol2^2)}}\right) + 1\right)$$

Where Rating1 & Vol1 are the rating and volatility of the resource being compared to, and Rating2 & Vol2 are the rating and volatility of the resource whose win probability is being calculated. Erf is the "error function".

The probability of the resource getting a higher score than another resource in the competition (WPi for i from 1 to NumCoders) is estimated. The expected rank of the resource is calculated:

$$ERank = .5 + \sum_{i=1}^{NumCoders} WP_i$$

The expected performance of the resource is calculated:

$$EPerf = -\Phi\left(\frac{Erank - .5}{NumCoders}\right)$$

Where Φ is the inverse of the standard normal function.

The actual performance of each resource is calculated:

$$APerf = -\Phi\left(\frac{Arank - .5}{NumCoders}\right)$$

Where ARank is the actual rank of the resource in the competition based on score (1 for first place, NumCoders for last). If the resource tied with another resource, the rank is the average of the positions covered by the tied resources.

The performed as rating of the resource is calculated:

$$PerfAs = OldRating + CF*(APerf - Eperf)$$

The weight of the competition for the resource is calculated:

$$Weight = \frac{1}{\left(1 - \left(\frac{.42}{TimesPlayed + 1} + .18\right)\right)} - 1$$

Where TimesPlayed is the number of times the resource has been rated before. To stabilize the higher rated members, the Weight of members whose rating is between 2000 and 2500 is decreased 10% and the Weight of members whose rating is over 2500 is decreased 20%.

A cap is calculated:

$$Cap = 150 + \frac{1500}{TimesPlayed + 2}$$

The new volatility of the resource is calculated:

$$NewVolatility = \sqrt{\frac{(NewRating - OldRating)^2}{Weight} + \frac{OldVolatility^2}{Weight + 1}}$$

The new rating of the resource is calculated:

$$NewRating = \frac{Rating + Weight * PerfAs}{1 + Weight}$$

If |NewRating−Rating|>Cap the NewRating is adjusted so it is at most Cap different than Rating.

Reliability

In some embodiments, a "reliability rating" also may be used to measure the likelihood that a resource will deliver deliverables in competitions in which the resource has committed to do so. For example, in some embodiments, a reliability factor is calculated as the percent of the past tasks that a resource registers for in which that same resource presents a timely submission that scores above a threshold value (e.g., 75) in review. The threshold is set so as to give a generally acceptable performance. The number of tasks measured may be limited in time, or to recent tasks (e.g., the last 15 tasks) so as to provide a current indication. The reliability rating may be broken out by task type, so as to give a more specific indication of that individual's likelihood of success.

Given enough historical data, a reliability rating may be used as a reasonable approximation of the probability that an individual will complete a task. For tasks of a particular type, the historical performance of an individual of successfully completing a task is a useful indicator of how likely that individual is to complete a similar task in the future. Note that in this case, the reliability rating is separate from the skill rating. The reliability rating provides data regarding how likely the individual is to submit acceptable deliverables, without considering quality. In some cases a reliability rating and a skill rating may be used in combination to determine a probability of success.

General Applicability

Although described with reference to software application and web site development, it should be understood that the principles described have applicability to all types of projects, and have particular applicability to projects with tasks involving the creation of works of authorship, documentation, analysis, reports, intangible work product, and the like.

What is claimed is:

1. A system for planning and executing projects, the system comprising at least one memory storing computer-executable instructions and at least one processing unit for executing the instructions stored in the memory, the execution of the instructions resulting in the processor being programmed to provide one or more application modules comprising:
a model specification module for creating a project model comprising tasks and dependencies among the tasks;
a task complexity module for determining the complexity of the tasks and for modifying the tasks to maintain the complexity within predetermined bounds, the modifying comprising dividing a first one of the tasks into a plurality of separate tasks if the probability of completion, by a resource, of the first task is below a first threshold;
a redundant task designation module for designating a second one of the tasks as a redundant task if the probability of completion of the second task is below a second threshold; and
a task market module for (i) making the redundant tasks available in a task market for completion by a plurality of redundant resources participating in the task market, and (ii) limiting the number of redundant resources that may undertake a redundant task based on the probability of completion thereof.

2. The system of claim 1, further comprising computer executable instructions that, when executed by the processor, result in the processor being programmed to provide a task criticality module for evaluating task criticality and designating tasks to be critical tasks.

3. The system of claim 2, further comprising computer executable instructions that, when executed by the processor, result in the processor being programmed such that the redundant task designation module designates redundant tasks based on task complexity and criticality.

4. The system of claim 1, further comprising computer executable instructions that, when executed by the processor, result in the processor being programmed such that redundant tasks are identified as such in the model.

5. The system of claim 1, further comprising computer executable instructions that, when executed by the processor, result in the processor being programmed such that the task market module makes redundant tasks available in a competitive task market for completion by competition, each available task for redundant completion by one or more competitors participating in the competitive task market.

6. The system of claim 1, further comprising computer executable instructions that, when executed by the processor, result in the processor being programmed such that redundant tasks are performed by engaging more than one resource to perform the task.

7. The system of claim 1, further comprising computer executable instructions that, when executed by the processor, result in the processor being programmed such that some tasks are designated as redundant, and other tasks are not designated as redundant.

8. The system of claim 1, further comprising computer executable instructions that, when executed by the processor, result in the processor being programmed such that all tasks are designated as redundant.

9. The system of claim 1, further comprising computer executable instructions that, when executed by the processor, result in the processor being programmed such that the probability of completion of the task to be made redundant is derived from a historical reliability rating of a resource assigned to the task to be made redundant.

10. The system of claim 1, further comprising computer executable instructions that, when executed by the processor, result in the processor being programmed to provide a module for displaying, in the model, a visual indicator for each task having a probability of task completion below a threshold.

11. The system of claim 1, further comprising computer executable instructions that, when executed by the processor, result in the processor being programmed to provide a module for displaying, in the model, a visual indicator for each task designated as a redundant task.

12. The system of claim 1, further comprising computer executable instructions that, when executed by the processor, result in the processor being programmed such that the modifying further comprises combining at least two of the tasks into a single task if the probability of completion, by a resource, of the tasks to be combined is greater than a third threshold.

13. A method, implemented on at least one computer, for planning and executing projects, the computer comprising:
   at least one memory storing computer-executable instructions; and
   at least one processing unit for executing the instructions stored in the memory, wherein execution of the instructions results in the at least one computer performing the steps of:
   defining a plurality of task types;
   facilitating specification, by project managers, of a project model comprising tasks and dependencies among the tasks, wherein each task is designated as one of the defined task types;
   determining a complexity of tasks and modifying tasks to maintain the complexity within predetermined bounds, the modifying comprising dividing a first task into a plurality of separate tasks if the probability of completion, by a resource, of the first task is below a first threshold
   calculating the probability of completion of each task based on the task type and historical data for the task type;
   designating a second task as a candidate to be undertaken by redundant resources if the probability of completion of the second task is below a second threshold;
   making the candidate tasks available in a task market for completion by a plurality of resources participating in the task market;
   limiting the number of redundant resources that may undertake a redundant task based on the probability of completion thereof; and
   tracking the success of each resource that undertakes a candidate task and updating the historical data for the task type associated with the candidate task based on the success of the undertaking resource.

14. The method of claim 13, further comprising evaluating task criticality.

15. The method of claim 14, wherein designating redundant tasks comprises designating redundant tasks based on task complexity and criticality.

* * * * *